July 13, 1926.
T. HOSKING ET AL
DRIVING GEAR FOR MOTOR CAR FANS
Filed May 3, 1924
1,591,978
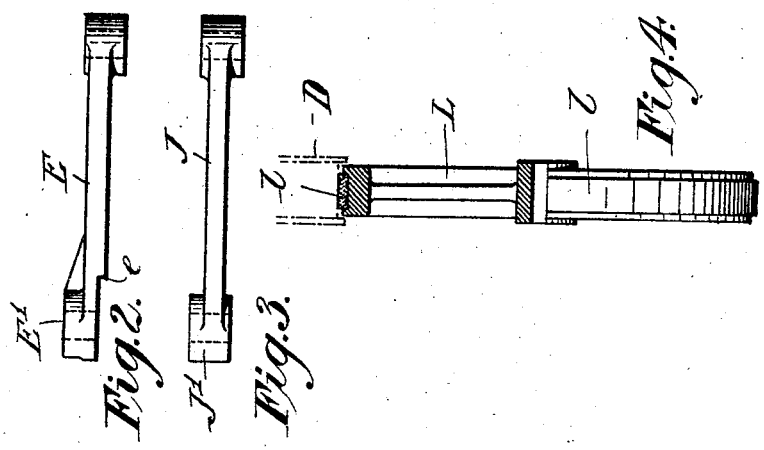
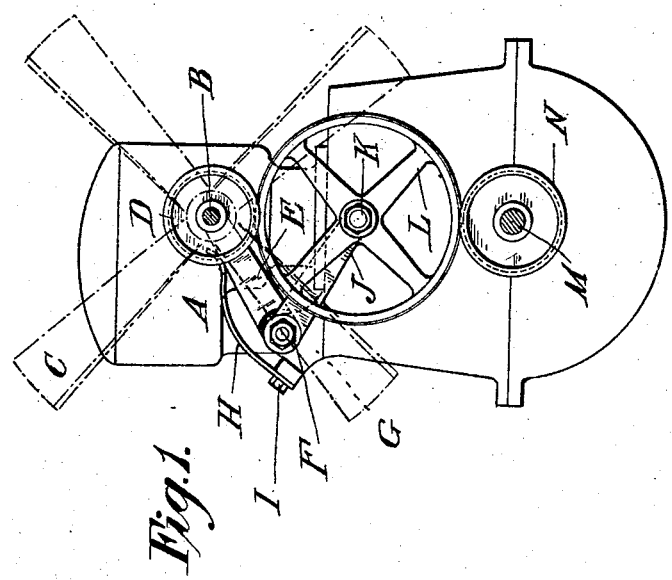
Inventors:—
Toner Hosking
B. T. Davis Patented July 13, 1926.

1,591,978

UNITED STATES PATENT OFFICE.

TONER HOSKING, OF SOUTH MELBOURNE, AND BENJAMIN THOMAS DAVIS, OF NORTH MELBOURNE, VICTORIA, AUSTRALIA.

DRIVING GEAR FOR MOTOR-CAR FANS.

Application filed May 3, 1924, Serial No. 710,889, and in Australia August 8, 1923.

This invention has been designed with the object of providing improved means for driving the fans utilized for cooling the engines of motor vehicles.

The usual practice of employing an endless belt mounted on the fan pulley and crank shaft pulley to drive the fan presents many disadvantages the chief of which are:—abnormal wearing of the pulley bearings; cutting of the commutator wires; frequent adjustment of the tension of the belt; and frequent disengagement of the belt from the pulleys causing a strain on the fan bushing and engine.

In this invention such defects are overcome by the employment of a friction wheel drive which is used in conjunction with the fan and crank shaft pulleys and dispenses with the driving belt usually adopted.

The herein friction wheel drive is applicable to different types of motor cars, but is especially affective and easily assembled on a motor car of the type wherein the fan spindle is adjustably supported by an arm carried on the machine frame and in which the driving pulley is mounted on the crank shaft.

The friction wheel employed is preferably made of metal the rim of which is recessed to receive an annular layer of such as brake lining which ensures a good frictional contact with the fan and crank shaft pulleys. The arm supporting the fan spindle is in this invention pivotally mounted on a pin or threaded bolt supported in a holed lug cast on the engine frame.

The lug also carries a stud which retains one end of a leaf spring the other and upper end of said spring bearing and exerting pressure on the said upper pivoted arm in order to ensure frictional contact of the fan pulley and friction wheel.

The pin or bolt carrying the upper pivoted arm also pivotally supports a lower arm which is formed wth an eye piece for the reception of a threaded bolt or pin upon which the intermediate or friction wheels is rotatably mounted. The friction wheel by means of the pivoted arms and spring pressure is always kept in frictional contact with the peripheries of the fan and driving pulleys.

The invention will now be more fully described having reference to the respective figures in the accompanying sheet of drawings in which—

Fig. 1 is a front elevation with the radiator removed of a motor car engine shewing the friction wheel drive for the fan pulley.

Figs. 2 and 3 denote the upper and lower arms which respectively support the fan spindle and intermediate friction drive wheel.

Fig. 4 is a side elevation, in part section, of the frictional drive wheel employed in the herein invention.

A represents the front end of the engine cylinder casing and B denotes the fan spindle and C the fan which is assembled on the spindle in any well-known manner. D is the driven pulley mounted on the fan spindle B which is supported from the upper end of an arm E which latter is formed with an eye $E^1$ by means of which it is pivotally mounted on a pin or threaded bolt F supported in a holed lug or bearing G cast or bolted to the crank casing. H is a leaf spring the upper end of which bears on the upper edge of the arm E and exerting pressure on same causes the arm to transmit its downward pressure on the fan spindle B, the opposite end of the spring H being securely held by means of a set screw I which screws into the tapped and projecting portion of the lug G. J is the lower arm which is also provided with an eye piece $J^1$ and is pivotally mounted on the belt F, the opposite and lower end of the arm J carrying such as a screw-threaded bolt or pin K upon which the intermediate and friction driving wheel L is rotatably mounted.

In order to provide for a free movement of the arm E the lower pivoted end of the latter is recessed as at e thus enabling it to be mounted aside of the arm J without contacting against the latter when it is being depressed.

M represents the crank shaft of the motor which carries the driving pulley N suitably mounted thereon the periphery of which pulley is engaged by the brake lining band l of the friction wheel L the periphery of the latter being also in engagement with the contacting surface of the fan pulley D.

It will be understood that the downward pressure exerted on the fan spindle B by means of the spring pressed arm E will be transmitted to the friction wheel L which being pivotally supported by the arm J can also be pressed against the rim of the driving pulley N and so always ensure that the fan will be kept running irrespective of the speed of the engine.

Having now described our invention what we claim as new and desire to secure by Letters Patent is:—

1. A driving gear for motor car fans, comprising in combination, an upper arm pivotally mounted on the motor casing, a fan spindle journaled in the upper end of said arm, a driven fan pulley on said spindle, a spring mounted on the motor casing and bearing against said upper arm, a lower arm pivotally mounted adjacent the upper arm, and a friction wheel rotatably mounted on the inner end of said lower arm with its periphery in frictional engagement with the fan pulley.

2. A driving gear for motor can fans, in combination with a motor casing and crank shaft, an upper arm pivotally mounted on the motor casing, a fan spindle journaled in the upper end of said arm, a driven fan pulley on said spindle, a lower arm pivotally mounted adjacent said upper arm, a friction wheel carried by said lower arm, a driving pulley mounted on the end of the motor crank shaft with the friction wheel engaging the periphery thereof, and a leaf spring mounted at one end on the motor casing and bearing at its opposite end on said upper arm to force the same downwardly to engage said driven fan wheel with said friction wheel.

In testimony whereof we have signed our names to this specification.

TONER HOSKING.
BENJAMIN THOMAS DAVIS.